United States Patent
Vij

(10) Patent No.: US 8,153,090 B2
(45) Date of Patent: Apr. 10, 2012

(54) COLD SELECTIVE CATALYTIC REDUCTION

(75) Inventor: Anu Vij, Chino Hills, CA (US)

(73) Assignee: OnQuest, Inc., San Dimas, CA (US)

( * ) Notice: Subject to any disclaimer, the term of this patent is extended or adjusted under 35 U.S.C. 154(b) by 7 days.

(21) Appl. No.: 12/899,328

(22) Filed: Oct. 6, 2010

(65) Prior Publication Data
US 2011/0081285 A1      Apr. 7, 2011

Related U.S. Application Data

(60) Provisional application No. 61/249,178, filed on Oct. 6, 2009.

(51) Int. Cl.
*B01D 53/86* (2006.01)
*B01J 8/04* (2006.01)
*B01J 19/00* (2006.01)
*G05D 7/00* (2006.01)

(52) U.S. Cl. ............... 423/210; 423/239.1; 423/245.3; 423/247; 423/DIG. 6; 422/105; 422/168; 422/173; 422/175; 422/177; 422/180; 422/206

(58) Field of Classification Search ............... 423/210, 423/239.1, 245.3, 247, DIG. 6; 422/105, 422/168, 173, 175, 177, 180, 206
See application file for complete search history.

(56) References Cited

U.S. PATENT DOCUMENTS

| | | | | |
|---|---|---|---|---|
| 5,024,817 A | * | 6/1991 | Mattison | 422/111 |
| 5,262,131 A | * | 11/1993 | Bayer et al. | 422/175 |
| 5,366,708 A | * | 11/1994 | Matros et al. | 423/210 |
| 5,589,142 A | | 12/1996 | Gribbon | |
| 5,770,162 A | * | 6/1998 | Niknafs | 422/169 |
| 5,891,411 A | * | 4/1999 | Gribbon | 423/245.3 |
| 6,092,367 A | | 7/2000 | Dolling | |
| 2008/0050297 A1 | * | 2/2008 | Harold et al. | 423/239.1 |

FOREIGN PATENT DOCUMENTS

EP      0191441 A1      8/1986

OTHER PUBLICATIONS

PCT/US2010/051650 filed Oct. 6, 2010 Search Report and Written Opinion of the International Searching Authority dated Nov. 30, 2010.

* cited by examiner

*Primary Examiner* — Timothy Vanoy
(74) *Attorney, Agent, or Firm* — Rutan & Tucker, LLP

(57) ABSTRACT

A system to control the emissions of a fluid stream in a cyclical fashion utilizing an up-flow cycle and a down-flow cycle. The system may include a first inlet and a first outlet at a first end of the system and a second inlet and a second outlet at a second end of the system, a catalyst zone between the first end and second end, two heat transfer zones, at least one heat transfer zone positioned between the catalyst zone and the first end of the system and between the catalyst zone and the second end of the system, and two heating zones, at least one heating zone positioned between the catalyst zone and each of the at least one heat transfer zones. The symmetrical arrangement permits a bi-directional fluid cycle to recover a portion of the energy supplied to the system during each cycle.

20 Claims, 3 Drawing Sheets

COLD SELECTIVE CATALYTIC REDUCTION

This application claims benefit to the filing date of provisional application 61/249,178 filed on 06 Oct. 2009.

BACKGROUND

Various industrial processes emit emissions containing undesirable pollutants like NOx, CO, VOCs and HAPs. These harmful pollutants may need to be removed from the flue gas before releasing into the atmosphere to meet the Environmental Protection Agency (EPA) requirements. Current technologies enabling industries to remove the pollutants include thermal oxidation (direct fired, recuperative or regenerative) and selective catalytic reduction.

Existing thermal oxidation technologies are limited to the removal of CO, VOCs and HAPs by heating the flue gas to a temperature greater than 1400 deg. F. Direct fired thermal oxidation has no heat recovery. Recuperative thermal oxidation may recover 60-80% of the heat required to heat the flue gas to a temperature greater than 1400 deg. F. Regenerative thermal oxidation may recover 85-95% of the heat required to heat the flue gas to a temperature greater than 1400 deg. F.

Existing selective catalytic reduction technologies are believed to be limited to the removal of NOx by either entry into the process system where the temperature is between 500 to 700 deg. F. or heating the flue gas to a temperature between 500 to 700 deg. F. These technologies do not appear to be capable of removing NOx efficiently at a flue gas temperature of less than 480 deg. F.

Other potential limitations of the current selective catalytic reduction technologies include, but are not limited to: (1) issues of incorporation into systems where space is constrained close to the temperature zone between 480 to 700 deg. F.; (2) revamps of existing systems are limited where turnaround times are not achievable unless the NOx removal product is only by a standalone tie-in; (3) multiple process streams resulting in fluctuating flue gas temperature from ambient to less than 480 deg. F.; and (4) catalyst plugging by the particulate matter in the flue gas.

SUMMARY OF THE INVENTION

A Cold Selective Catalytic Reduction (CSCR) system and method include selective catalytic reduction and regenerative thermal oxidation to enable removal of Nitrogen (NOx), carbon monoxide (CO), volatile organic compounds (VOCs) and hazardous air pollutants (HAPs) in a single chamber while achieving very high thermal efficiency. Embodiments as described herein include new, lower-temperature selective catalytic reduction systems that use regenerative heat exchange to minimize the amount of additional heat required during the oxidization process. Significant benefits may be obtained for thermal efficiency, as flue gases can be treated with low exhaust gas temperatures of about 200-300 deg. F., therefore allowing the thermal oxidization to take place after economizer or waste-heat recovery units.

Embodiments as described herein utilize a single chamber to optimize the catalyst, space and structural steel. For example, the CSCR system and method described herein may be a single cylindrical or rectangular chamber which may have inlet and outlet ducts directly coupled to the top and bottom of the chamber, respectively. Flue gas flow may be controlled using dampers/valves and induced draft fan/forced draft fan. From the bottom to top, the chamber may include one or more of the following components: (1) first heat transfer media section; (2) first ammonia distribution section and burners; (3) NOx, CO, VOCs and HAPs catalyst; (4) second ammonia distribution section and burners; and (5) second heat transfer media section. Catalyst used may be in single or multiple layers and may be selected depending on the pollutant constituents to be removed. Further, while a first and second heat transfer media are disclosed, it should be understood that a third, fourth or more heat transfer media section is within the scope of the invention. Further still, while a first and second ammonia distribution section and burners are disclosed, it should be understood that a third, fourth or more ammonia distribution section and burners is within the scope of the invention.

In one embodiment, the emissions containing pollutant is processed by the CSCR system in cyclical fashion utilizing an up-flow cycle and a down-flow cycle through the CSCR system. These alternating cycles may be repeated in time intervals, for example after every 1-10 minutes, in order to achieve optimal heat recovery. Final cycle time tuning is dependent on a number of variables, including the heat transfer media utilized, and can be field tested for optimization.

DETAILED DESCRIPTION

Figure 1:
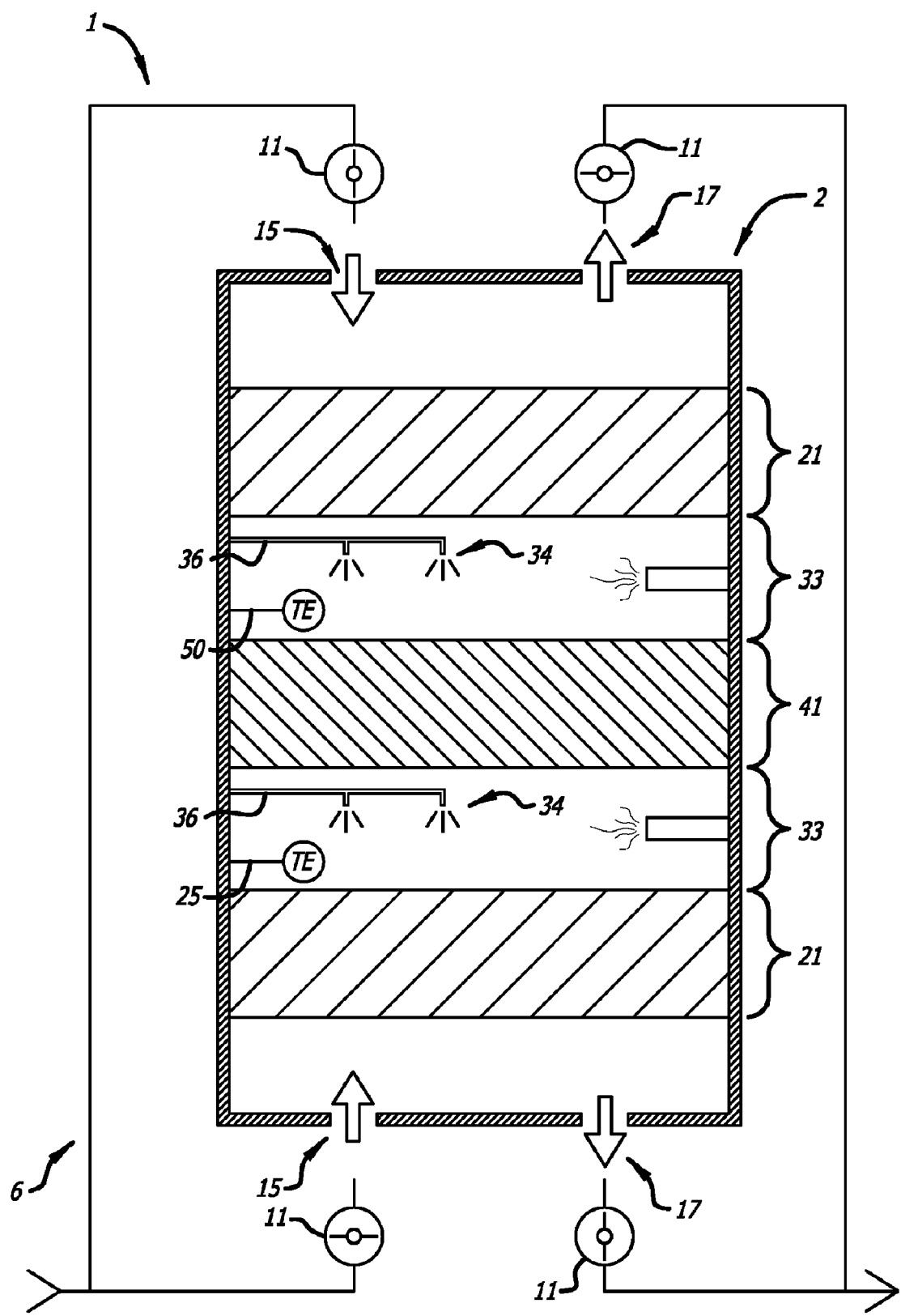
FIG. 1 illustrates a diagrammatic representation of a Cold Selective Catalytic Reduction system according to embodiments as described.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale. While examples are provided herein with respect to the removal of volatile organic compounds (VOCs), hazardous air pollutants (HAPs), carbon monoxide (CO), and oxides of Nitrogen (NOx) via a single chamber cold selective catalytic reduction system and method, it should be appreciated that the principles of the invention described herein may be applicable to other types of pollutants not specifically discussed herein. Further, embodiments as described herein may be combined to remove pollutants, as well as to recover heat.

Embodiments as described herein utilize a single chamber to optimize the catalyst, space and structural steel. For example, the CSCR system and method described herein may be a single cylindrical or rectangular chamber which may have inlet and outlet ducts directly coupled to the top and bottom of the chamber, respectively. The emissions containing pollutant, such as a flue gas, is processed by the CSCR system in cyclical fashion utilizing a bi-directional gas flow through the CSCR system permitting an up-flow cycle and a down-flow cycle.

In the up-flow cycle, the flue gas enters through the bottom of the chamber and passes through the first heat transfer media section to be pre-heated. The flue gas may then be heated to the desired final temperature (e.g., 600 to 1100 deg. F.) by the burners and may mix with ammonia and pass up through the catalyst, which removes some or all of the pollutants. In one embodiment, burners and ammonia distribution in the upper section may not be used in this up-flow cycle. Flue gas may then pass up through the heat transfer media where the flue gas may transfer the heat to the heat transfer media and exit the single chamber. Flue gas may exit at approximately the same temperature as the inlet temperature.

In the down-flow cycle, flue gas enters through the top of the single chamber and passes downward through the heat transfer media to absorb the heat from heat transfer media to be pre-heated. The flue gas may then be heated to the preferred final temperature (e.g., 600 to 1100 deg. F.) by the burners, and may mix with ammonia, and pass down through the catalyst, which removes some or all of the pollutants. In one embodiment, burners and ammonia distribution in the lower section may not be used in the down-flow cycle. Flue gas may then pass down through the heat transfer media where the flue gas may transfer the heat to the heat transfer media and exit the single chamber. Flue gas may exit at approximately the same temperature as the inlet temperature.

Up-flow and down-flow cycles may be repeated at a desired interval to achieve the heat recovery and pollutant removal at the same time. Final cycle time tuning may depend on the heat transfer media used.

FIG. 1 illustrates a representative Cold Selective Catalytic Reduction system 1 according to an exemplary embodiment. The system 1 is composed of a chamber 2 to pass the flue gas through the cold selective catalytic reduction process as described herein. The chamber 1 includes two or more heat transfer zones 21, two or more heating zones 33, and one or more catalyst reduction zones 41. The multiple heat transfer zones 21 and heating zones 33 are arranged to permit bi-directional flow of the flue gas for catalytic reduction of the flue gas in both directions. The chamber 2 also includes inlets 15 and outlets 17 along with dampers and valves 11 to accommodate the bi-directional gas flow.

In one embodiment, the catalytic reduction process components are housed in a single chamber 21. Embodiments as described herein utilize a single chamber to optimize the catalyst, working space, and structural material. However, as would be understood by a person of skill in the art, the described zones and sections of the chamber may be sub-divided into two or more chambers. The chamber 21 may be a single chamber generally cylindrical, rectangular, square, elliptical, or a combination of these, which may have inlet ducts 15 and outlet ducts 17 directly coupled to the top and bottom of the chamber, respectively. The chamber may be designed to withstand the temperatures associated with the reduction process. For example, the chamber may be of structural steel that is internally lined with a refractory linking, such as brick, castable, ceramic fiber, or a mixture of these. The emissions containing pollutant, such as a flue gas, is processed by the CSCR system in cyclical fashion utilizing a bi-directional air flow producing an up-flow cycle and a down-flow cycle, as described more fully below.

In one embodiment, the chamber 2 houses two or more heat transfer zones 21. These zones include a heat transfer media 20 and 60 to recapture some of the energy required to heat the flue gas for the catalytic reduction. As the dirty flue gas enters the system, the gas passes through one or more of the heat transfer zones 21, thereby pre-heating the gas and requiring less energy to raise the gas to the desired catalytic reduction temperature. As the cleaned flue gas exits the system, the gas passes through one or more of the heat transfer zones 21; thereby depositing its heat to be used by the next cycle. The heat transfer zone 21 captures the heat of the gas so that the cleaned flue gas preferably exits the system approximately at or below the temperature it enters the system. The heat transfer zones may be positioned on opposing sides of the catalyst zone 41 so that the separate zones are alternatively used to cool the exit gas and pre-heat the incoming gas and cool, as described more fully below. The heat transfer media may be any material with sufficient heat transfer properties, such as alumina and silica.

In one embodiment, the chamber 2 houses two or more heating zones 33 to provide the temperature necessary for the selective catalytic reduction. The two or more heating zones may be on opposing sides of the catalyst zone 41 to sufficiently heat the flue gas before entering the catalyst zone 41 while accommodating the bi-directional flow of flue gas through the system.

A chemical reducing agent 35 may also be added to the flue gas within the heating zones 33. The chemical reducing agent 35 is injected into the gas stream before the gas enters the catalyst zone 41, as described below. In an exemplary embodiment, ammonia is used as the chemical reducing agent to reduce NOx, producing Nitrogen and water vapor. The chemical reducing agent 35 may be ammonia in either aqueous or anhydrous form. The chemical reducing agent may be supplied to the chamber through by an injection grid 36 to provide sufficient and even distribution of the chemical throughout the gas stream before entering the catalyst zone. A separate injection grid 36 may be used in each heating zone 33 to supply the chemical reducing agent 35 to the flue gas before it enters the catalyst zone 41 from either direction. The injection system which supplies the injection grid may also be controlled electronically to minimize the amount of un-reacted reducing agent in the gas stream after the reactor. Accordingly, additional monitors, and feedback controls may be used to analyze the cleaned flue gas and control the amount of reducing agent and other reactor parameters, including temperature and residence time. However, the system may not use an ammonia distribution section if the pollutants to be removed do not include Nox, such as a combination of pollutants composed of CO, VOCs and HAPs only.

In one embodiment, the chamber 2 houses one or more chemical catalyst 40. Using a catalyst 40 allows oxidation to occur at around 600 deg. F., instead of the usual 1600 deg. F., saving approximately two-thirds on fuel consumption. Hazardous air pollutants that are organic in nature, for example—poly-cyclic aromatic hydrocarbons (PAH) and solvent vapors—are converted through oxidation to carbon dioxide and water. The heated VOC-laden air is passed through the chemical catalysts, such as for example, a bed of solid catalyst, where the VOCS are rapidly oxidized. Alternate embodiments include a single or multiple beds within the chamber of the CSCR system. The chemical catalyst 40 may chosen depending on the pollutants within the passed air stream. For example, systems used to oxidize VOCs may use a metal oxide, such as nickel oxide, copper oxide, manganese dioxide, or chromium oxide. Nobel metals such as platinum and palladium may also be used. The chemical catalyst 40 may be located within the catalyst zone 41 within the chamber 2. The catalyst zone 41 may be located after the heating zones 33 to permit sufficient heating of the dirty flue gas before entering the catalyst 40.

Embodiments as described herein, may also include an air pollution control system. Dusts, mists, and SOx/H2S can all reduce the activity of the catalyst. Dusts and mists can plug the pores of the catalyst support, blocking off the active sites. Sulfur and heavy metals can react with the catalyst, effectively poisoning the catalytic process by forming new compounds and alloys which lack catalytic reactivity. The system may therefore include dust collection and flue gas treatment systems before the flue gas enters the chamber 2. Additionally or alternatively, guard-beds of catalyst support material which have not been dosed with the metallic catalyst may be used to polish out the stray materials which bypass upstream dust collection and flue gas treatment steps. In one embodiment, the heat transfer media may act as a filter to protect the plugging of the catalyst. Heat transfer media may be configured to plug before the catalyst, thereby protecting the expensive catalyst. The catalyst may cost more than 10 times the cost of the heat transfer media.

Figure 2:
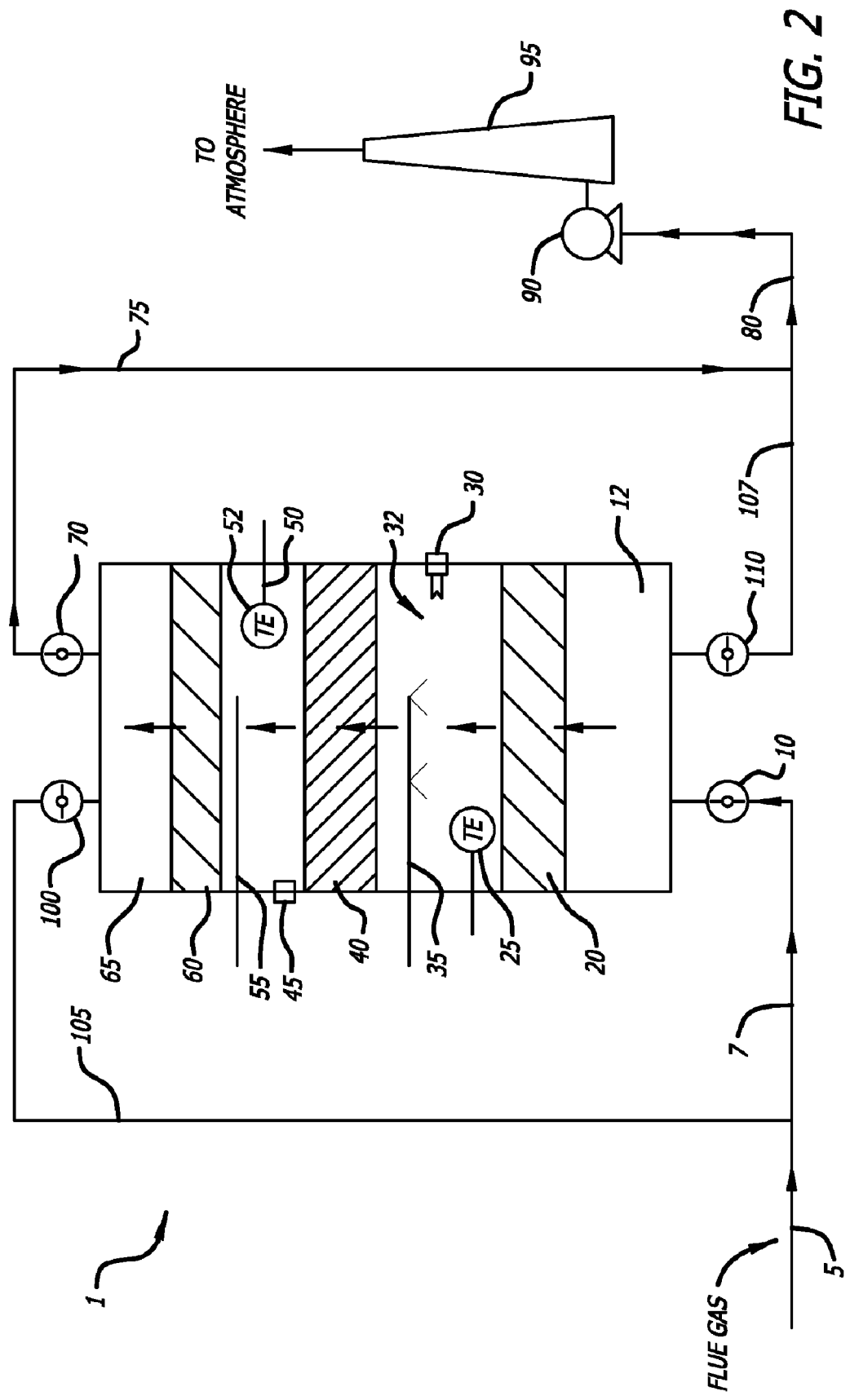
FIG. 2 illustrates a diagrammatic representation of an up-flow cycle in a Cold Selective Catalytic Reduction system according to embodiments as described.
Figure 3:
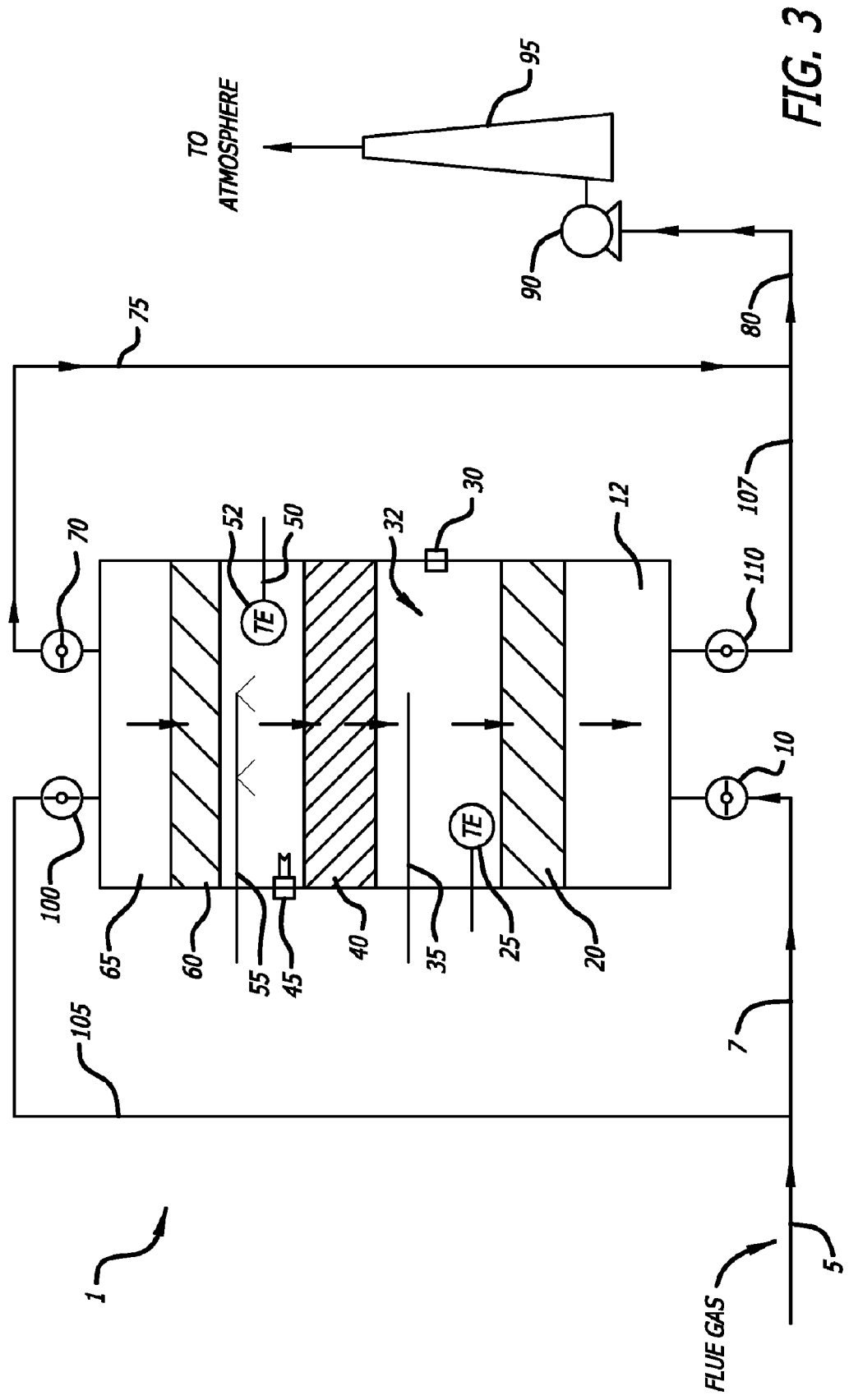
FIG. 3 illustrates a diagrammatic representation of a down-flow cycle in a Cold Selective Catalytic Reduction system according to embodiments as described.

FIGS. 2 and 3 illustrate a representative Cold Selective Catalytic Reduction method of using the Cold Selective Catalytic Reduction system 1 according to embodiments as described herein. Referring to FIG. 2, illustrating a representative up-flow cycle, the flue gas enters the ductwork 5 and continues through the ductwork 7. The flue gas from ductwork 7 enters through the damper 10 into section 12 of the single chamber. The flue gas from section 12 passes up through a first heat transfer media section 20 and is pre-heated. The flue gas then passes up through section 32 where it is heated to a preferred final temperature, such as, for example 600-1100 deg. F., by the burners 30 and mixes with ammonia 35. The temperature may be controlled by thermocouple 25. The flue gas next passes up through the NOx, CO, VOCs and HAPs catalyst 40. All or substantially all of the pollutants are removed by the catalyst 40. In one embodiment, the flue gas then passes up through section 52, and the burners 45, ammonia 55 and thermocouple 50 may not be used in this up cycle. Flue gas then passes up through the second heat transfer media section 60 where the flue gas may transfer the heat to the heat transfer media and pass up through section 65 of the single chamber. The flue gas then exits section 65 through damper 70. The flue gas from the damper 70 may continue through ductwork 75. The flue gas from ductwork 75 may continue through ductwork 80. The flue gas from ductwork 80 may enter the centrifugal fan 90 and finally into the stack 95 to be discharged to atmosphere. The centrifugal fan 90 may provide the motive force for the flue gas from ductwork 5 through the single chamber through ductwork 80 and final discharge through the stack 95.

After the completion of the up-flow cycle, which may take, for example, 1-10 minutes, the down-flow cycle can be performed. For the down-flow cycle to start, the damper 10 transitions to a closed position, damper 100 transitions to an open position, damper 70 transitions to a closed position, and damper 110 transitions to an open position.

Referring to FIG. 3, illustrating a representative down-flow cycle, the flue gas enters the ductwork 5 and continues through the ductwork 105. The flue gas from ductwork 105 enters through the damper 100 into section 65 of the single chamber. The flue gas from section 65 passes down through the second heat transfer media 60 and is pre-heated. The flue gas then passes down through section 52 where it may be heated to the preferred final temperature, such as for example, 600-1100 deg. F., by the burners 45 and mixed with ammonia 55. The temperature may be controlled by thermocouple 50. The flue gas then passes through the NOx, CO, VOCs and HAPs catalyst 40. All or substantially all of the pollutants may be removed by the catalyst 40. In one embodiment, the flue gas passes down through section 32 and the burners 30, ammonia 35 and thermocouple 25 may not be used in this down cycle. Flue gas may then pass down through the first heat transfer media 20 where the flue gas may transfer the heat to the heat transfer media and pass down through section 12 of the single chamber. The flue gas then exits section 12 through damper 110. The flue gas from the damper 110 may continue through ductwork 107. The flue gas from ductwork 107 may continue through ductwork 80. The flue gas from ductwork 80 may enter the centrifugal fan 90 and finally into the stack 95 to be discharged to atmosphere. The centrifugal fan 90 may provide the motive force for the flue gas from ductwork 5 through the single chamber through ductwork 80 and final discharge through the stack 95.

After the completion of the down-flow cycle, which may take, for example, 1-10 minutes, another up-flow cycle may start. For the up-flow cycle to start, the damper 10 transitions to an open position, damper 100 transitions to a closed position, damper 70 transitions to an open position, and damper 110 transitions to a closed position. Up-flow and down-flow cycles may be repeated, for example, every 1-10 minutes to achieve heat recovery and simultaneously remove some or all of the pollutants from the emission feed.

According to various embodiments of the system, different operating parameters and results may be obtained or achieved. For example, the CSCR system and method may be applicable for flue gas at a temperature from ambient to 500 plus deg. F. The CSCR system and method may use less than 5% of the heat required to catalytically remove NOx, CO, VOCs and HAPs by heating the flue gas to the preferred final temperature (600-1100 deg. F.). In one embodiment, the CSCR system and method may remove greater than 90% of NOx and greater than 95% of CO, VOCs and HAPs.

According to various embodiments of the system, the CSCR system does not have to be installed adjacent to the temperature zone of 500-700 deg. F. It can be installed to site specific space availability. Temperature loss in the CSCR system during the associated method may have no effect on the pollutants removal efficiency. In one embodiment, the CSCR system can be installed while a process system is in operation such that only a tie-in may be required into the process system to start operating the CSCR system and method.

Embodiments, as described herein, may be applied to handle emissions from multiple process streams resulting in fluctuating flue gas temperature from ambient to less than 500 deg. F., while maintaining the pollutants removal efficiency. For example, using regenerative heat recovery, as described herein, is a practical method for combining multiple effluent gas streams into a single feed stream, allowing one unit to treat a facility or process unit. Embodiments as described herein, can save as much as 95% is fuel consumption, for only a 6% increase in power use, when compared to conventional SCR units.

What is claimed is:

1. A system to remove pollutants from a fluid stream, comprising:
a first inlet and a first outlet at a first end of the system and a second inlet and a second outlet at a second end of the system;
a catalyst zone between the first end and second end;
two heat transfer zones, at least one heat transfer zone positioned between the catalyst zone and the first end of the system and between the catalyst zone and the second end of the system; and
two heating zones, at least one heating zone positioned between the catalyst zone and each of the at least one heat transfer zone.

2. The system of claim 1, further comprising two injection systems within each of the at least one heating zone to introduce a chemical reducing agent into the system, the injection systems formed as a grid to distribute the chemical reducing agent into the fluid stream, wherein the chemical reducing agent comprises ammonia to reduce an amount of NOx from the fluid stream.

3. The system of claim 2, wherein the injection systems further comprise an electronic feedback and control system to monitor a quantity of un-reacted reducing agent in the fluid stream at the first outlet and second outlet of the system and control an injected quantity of reducing agent into the system through the injection systems.

4. The system of claim 1, further comprising a generally cylindrical chamber of structure steel internally lined with refractory lining, wherein the first inlet and first outlet are at a top end of the chamber and the second inlet and second outlet are at a bottom end of the chamber, the catalyst zone is positioned generally at a middle section of the chamber, and each of the at least one heating zone is positioned adjacent the first inlet and second inlet.

5. The system of claim 1, wherein each of the at least one heat transfer zone comprises a heat transfer media to recapture heat energy of the fluid stream as the fluid stream exits the system and to pre-heat the fluid stream as the fluid stream enters the system, wherein the heat transfer media comprises alumina and silica.

6. The system of claim 1, wherein each of the at least one heating zone comprises a burner to provide heat energy to raise a temperature of the fluid stream to at least approximately 600 deg. F. and a temperature sensor linked to the burner such that the burner is fired in response to the temperature sensor to maintain each of the at least one heating zone at a desired temperature.

7. The system of claim 1, further comprising a control system to automatically control valves at the first inlet, first outlet, second inlet and second outlet so that the valves are opened and closed to permit bi-directional cyclic flow of the fluid stream between the first and the second end of the system, wherein the control system further controls an energy supply to each of the at least one heating zone to heat each of the at least one heating zone cyclically corresponding to the bi-directional cyclic flow of the fluid stream.

8. The system of claim 1, further comprising an air pollution control system.

9. A method for removing pollutants from a fluid stream, comprising:
    passing a first fluid stream from a first end of a system to a second end through a first heat transfer zone, a first heating zone, and a catalyst zone; and
    passing a second fluid stream from the second end of the system to the first end through a second heat transfer zone separate from the first heat transfer zone, a second heating zone separate from the first heating zone, and the catalyst zone.

10. The method of claim 9, wherein the first fluid stream is heated to a desired temperature above at least 600 deg. F. for cold selective catalytic reduction in the first heating zone, and is passed through the catalyst zone comprising a catalyst material to oxidize a pollutant within the first fluid stream, and wherein the second fluid stream is heated to the desired temperature above at least 600 deg. F. for cold selective catalytic reduction in the second heating zone, and is passed through the catalyst zone comprising the catalyst material to oxidize the pollutant within the second fluid stream.

11. The method of claim 9, further comprising mixing the first fluid stream with a reducing agent in the first heating zone prior to passing the first fluid stream through the catalyst zone to reduce a pollutant from the first fluid stream, and mixing the second fluid stream with the reducing agent in the second heating zone prior to passing the second fluid stream through the catalyst zone to reduce the pollutant from the second fluid stream.

12. The method of claim 9, wherein the second heat transfer zone comprises a heat transfer media so that passing the first fluid stream through the second heat transfer zone comprises cooling the first fluid stream so that the heat transfer media of the second heat transfer zone obtains energy to pre-heat the second fluid stream when the second fluid stream is passed through the second heat transfer zone; and wherein the first heat transfer zone comprises the heat transfer media so that passing the second fluid stream through the first heat transfer zone comprises cooling the second fluid stream so that the heat transfer media of the first heat transfer zone obtains energy to pre-heat a third fluid stream when the third fluid stream is passed through the first heat transfer zone.

13. The method of claim 12, further comprising passing the first fluid stream through the second heating zone before cooling the first fluid stream without supplying energy to further heat the first fluid stream, and passing the second fluid stream through the first heating zone before cooling the second fluid stream without supplying energy to further heat the second fluid stream.

14. The method of claim 10, wherein passing the first fluid stream from the first end of the system and passing the second fluid stream from the second end of the system occur in alternating cycles.

15. The method of claim 14, wherein the system is housed within a single chamber, such that the first fluid stream is passed from a first end of the chamber to a second end of the chamber through the first heat transfer zone, first heating zone, the catalyst zone, and the second heat transfer zone, and the second fluid stream is passed from the second end of the chamber to the first end of the chamber through the second heat transfer zone, second heating zone, the catalyst zone, and the first heat transfer zone, in alternating cycles.

16. The method of claim 15, further comprising passing the first fluid steam through a first filter before passing the first fluid stream through the catalyst zone to reduce contaminants in the first fluid stream that would plug the catalyst zone, and passing the second fluid stream through a second filter before passing the second fluid stream through the catalyst zone to reduce contaminants in the second fluid stream that would plug the catalyst zone.

17. The method of claim 10, wherein the first and second heating zone comprises a burner to provide heat energy to raise a temperature of the first and second fluid stream to at least approximately 600 deg. F. and a temperature sensor linked to the burner such that the burner is fired in response to the temperature sensor to maintain the first and second heating zone at a desired temperature.

18. The method of claim 10, wherein the system further comprises a control system and valves to cyclically permit bi-directional fluid flow of the first fluid stream and second fluid stream through the system, wherein the method further comprises opening a first outlet valve and then opening a first inlet valve to permit the first fluid stream to pass through the system, and closing the first inlet valve and then the first outlet valve and opening a second outlet valve then a second inlet valve to pass the second fluid stream through the system.

19. A method of cold selective catalytic reduction for removing pollutants from a fluid stream, comprising:
    a first fluid flow cycle to remove pollutants from a fluid stream, comprising:
        introducing the fluid stream into an interior of a chamber from a first end of the chamber;

pre-heating the fluid stream by passing the fluid stream through a first heat transfer media adjacent the first end of the chamber;

heating the fluid stream to a desired temperature for cold selective catalytic reduction in a first heating zone adjacent the first heat transfer media;

passing the fluid stream through a catalyst to oxidize the pollutants within the fluid stream and remove the pollutants from the fluid stream;

mixing the fluid stream with a chemical reducing agent by injecting the chemical reducing agent into a first area of the chamber so that the fluid stream is mixed before it is passed through the catalyst;

cooling the fluid stream by passing the fluid stream through a second heat transfer media adjacent the second end of the chamber;

exiting the fluid stream from the chamber interior through the second end of the chamber;

a second fluid flow cycle to remove pollutants from the fluid stream, wherein the fluid stream is diverted from a common source as the first fluid flow cycle:

introducing the fluid stream into the interior of the chamber form the second end of the chamber;

pre-heating the fluid stream by passing the fluid stream through the second heat transfer media adjacent the second end of the chamber, whereby the fluid stream is heated by an energy deposited by the cooling of the fluid stream through the first fluid flow cycle;

heating the fluid stream to a desired temperature for cold selective catalytic reduction in a second heating zone adjacent the second heat transfer media;

passing the fluid stream through the catalyst to oxidize the pollutants within the fluid stream and remove the pollutants from the fluid stream;

mixing the fluid stream with the chemical reducing agent by injecting the chemical reducing agent into a second area of the chamber so that the fluid stream is mixed before it is passed through the catalyst;

cooling the fluid stream by passing the fluid stream through the first heat transfer media adjacent the first end of the chamber;

exiting the fluid stream from the chamber interior through the first end of the chamber.

20. The method of claim 19, further comprising a control system to automatically control valves to permit the fluid flow to flow in a bi-directional cycle comprising the first fluid flow cycle from the first end of the chamber to the second end and the second fluid flow cycle from the second end of the chamber to the first end, the control system further controlling the heating of the fluid streams in the first heating zone and second heating zone depending on a fluid cycle, and the injection of the chemical reducing agent into the fluid stream.

* * * * *